US010198970B2

(12) United States Patent
McClintock et al.

(10) Patent No.: US 10,198,970 B2
(45) Date of Patent: Feb. 5, 2019

(54) GROWING SPINE MODEL

(71) Applicant: K2M, Inc., Leesburg, VA (US)

(72) Inventors: Larry McClintock, Gore, VA (US);
Brandon Moore, Summit Point, WV (US); Clint Boyd, Winchester, VA (US); Michael Barrus, Ashburn, VA (US)

(73) Assignee: K2M, Inc., Leesburg, VA (US)

( * ) Notice: Subject to any disclaimer, the term of this patent is extended or adjusted under 35 U.S.C. 154(b) by 0 days.

(21) Appl. No.: 14/798,591

(22) Filed: Jul. 14, 2015

(65) Prior Publication Data

US 2016/0012753 A1 Jan. 14, 2016

Related U.S. Application Data

(60) Provisional application No. 62/024,127, filed on Jul. 14, 2014.

(51) Int. Cl.
G09B 23/32 (2006.01)
G09B 23/34 (2006.01)
G09B 23/00 (2006.01)
G09B 23/30 (2006.01)

(52) U.S. Cl.
CPC ............ *G09B 23/32* (2013.01); *G09B 23/34* (2013.01); *G09B 23/00* (2013.01); *G09B 23/30* (2013.01)

(58) Field of Classification Search
USPC ....................................... 434/262, 267, 274
See application file for complete search history.

(56) References Cited

U.S. PATENT DOCUMENTS

| 2,108,229 A | 2/1938 | Metz |
| 2,197,975 A | 4/1940 | Fleet |
| 3,513,569 A | 5/1970 | Herou |
| 4,699,874 A | 10/1987 | Kitagawa et al. |
| 5,330,473 A | 7/1994 | Howland |
| 5,389,099 A | 2/1995 | Hartmeister et al. |
| 5,672,059 A | 9/1997 | Browne-Wilkinson |
| 6,136,003 A | 10/2000 | Hoeck et al. |
| 7,029,472 B1 | 4/2006 | Fortin |
| 7,563,274 B2 | 7/2009 | Justis et al. |

(Continued)

FOREIGN PATENT DOCUMENTS

| DE | 605262 C | 11/1934 |
| EP | 2712560 A1 | 4/2014 |

OTHER PUBLICATIONS

European Search Report EP15176613 dated Oct. 19, 2015.
"Evolution of Hydraulics System", Dec. 31, 2010, pp. 1-2. Retrieved from the Internet: URL: http://hydraulicmania.com/.

*Primary Examiner* — James Hull
(74) *Attorney, Agent, or Firm* — Lerner, David, Littenberg, Krumholz & Mentlik, LLP

(57) ABSTRACT

A spinal surgery modeling system includes a spine model and a spine movement device. The spinal surgery modeling system provides a three-dimensional hands-on model that can be configured to have any desired variation of spinal alignment of the spine model by hydraulic actuation of the spine movement device to simulate the biomechanical feel and behavior of a patient's spine. The spine model may include various vertebral body or disc conditions and allows a clinician to examine and/or adjust the model and observe the three-dimensional outcome of such adjustments.

18 Claims, 9 Drawing Sheets

(56) References Cited

U.S. PATENT DOCUMENTS

| | | |
|---|---|---|
| 7,699,874 B2 | 4/2010 | Young |
| 7,942,676 B2 | 5/2011 | Murdach |
| 7,942,908 B2 | 5/2011 | Sacher et al. |
| 7,988,694 B2 | 8/2011 | Barrus et al. |
| 8,113,847 B2 | 2/2012 | Boachie-Adjei |
| 8,162,984 B2 | 4/2012 | Weirich et al. |
| 8,777,995 B2 | 7/2014 | McClintock et al. |
| 8,882,817 B2 | 11/2014 | Jones et al. |
| 9,168,070 B2 | 10/2015 | Mundis et al. |
| 2005/0192544 A1* | 9/2005 | Wolbring .......... A61M 5/31501 604/218 |
| 2006/0079892 A1 | 4/2006 | Roychowdhury et al. |
| 2007/0093817 A1 | 4/2007 | Barrus et al. |
| 2007/0173855 A1* | 7/2007 | Winn ...................... A61F 2/442 606/90 |
| 2008/0027432 A1 | 1/2008 | Strauss et al. |
| 2008/0027436 A1* | 1/2008 | Cournoyer ......... A61B 17/7079 606/250 |
| 2008/0086130 A1 | 4/2008 | Lake et al. |
| 2008/0195100 A1* | 8/2008 | Capote ............... A61B 17/7091 606/71 |
| 2009/0105716 A1 | 4/2009 | Barrus |
| 2009/0105769 A1 | 4/2009 | Rock et al. |
| 2009/0131981 A1* | 5/2009 | White .................. A61B 17/702 606/246 |
| 2009/0264831 A1* | 10/2009 | Thompson .............. A61M 5/19 604/191 |
| 2010/0106192 A1 | 4/2010 | Barry |
| 2011/0092859 A1* | 4/2011 | Neubardt ................ A61F 2/441 600/594 |
| 2013/0144342 A1* | 6/2013 | Strauss ................ A61B 17/701 606/261 |
| 2014/0272881 A1* | 9/2014 | Barsoum ................ G09B 23/30 434/274 |

\* cited by examiner

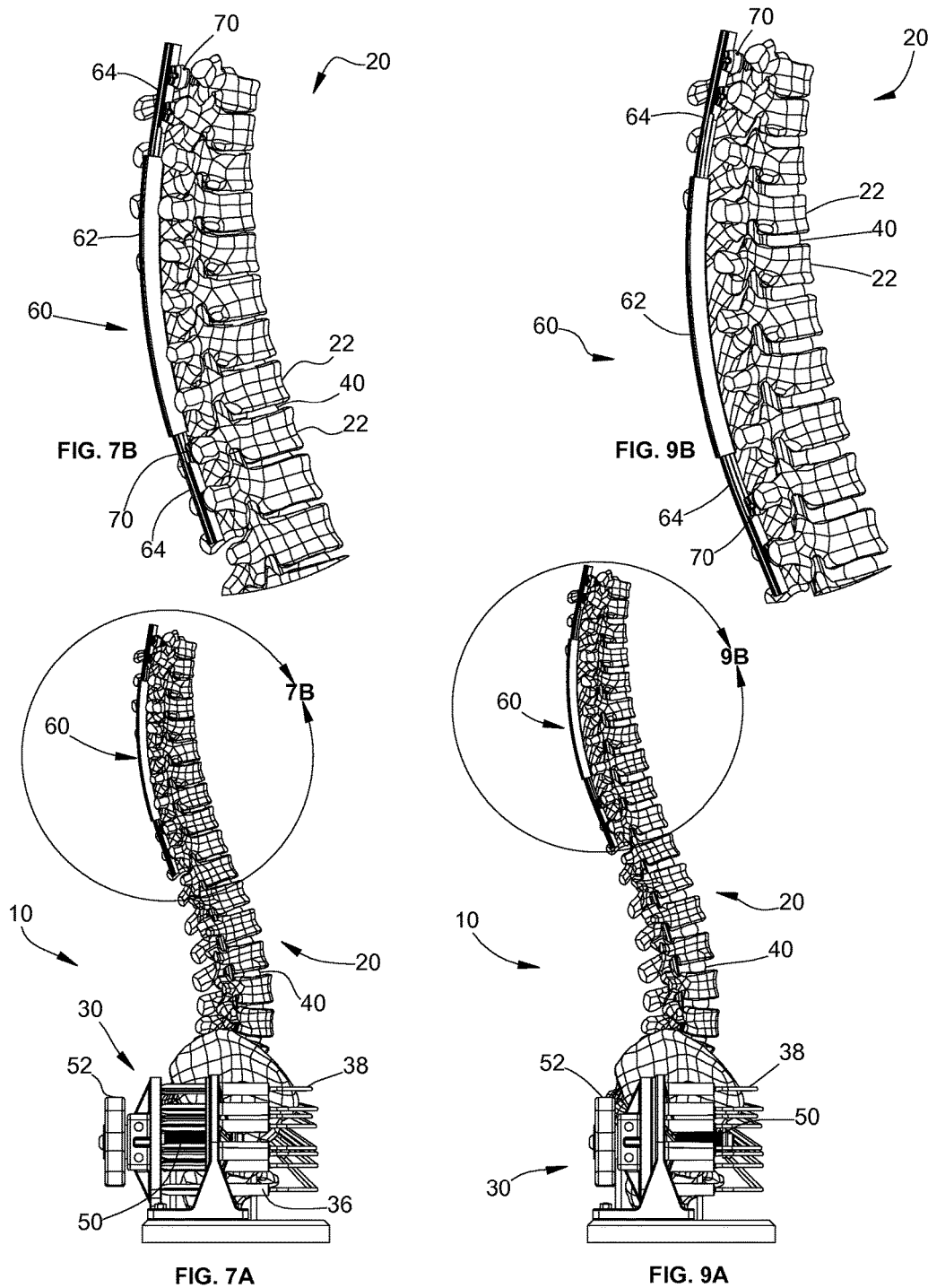

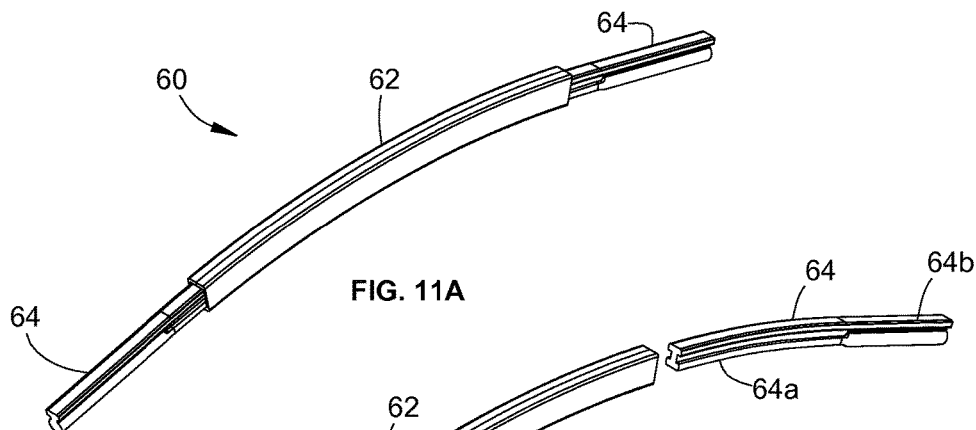
FIG. 11A
FIG. 11B
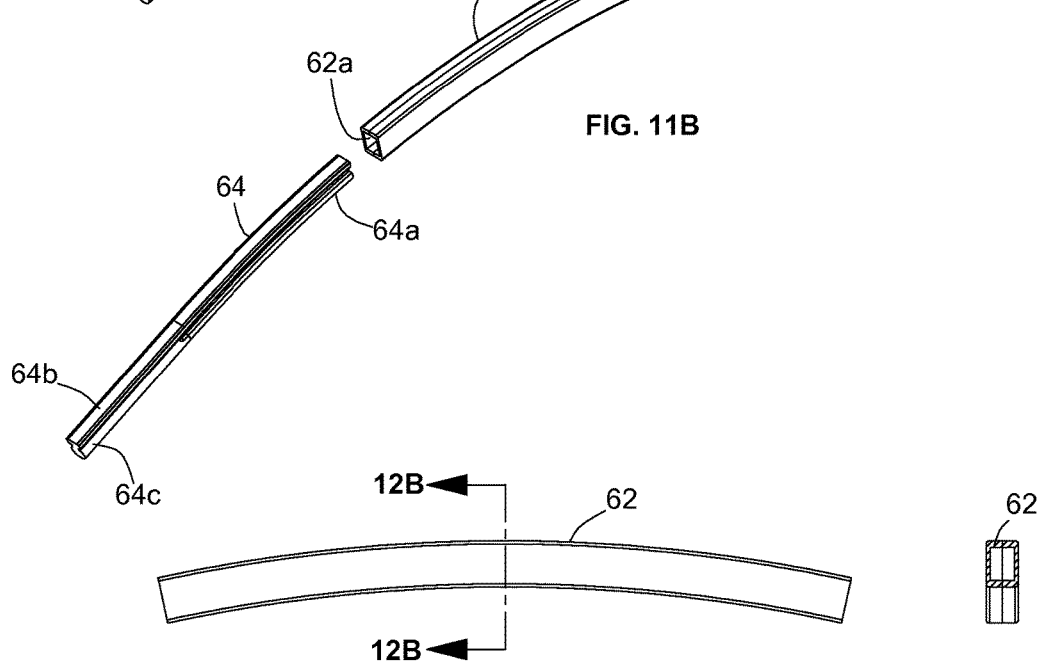
FIG. 12A
FIG. 12B
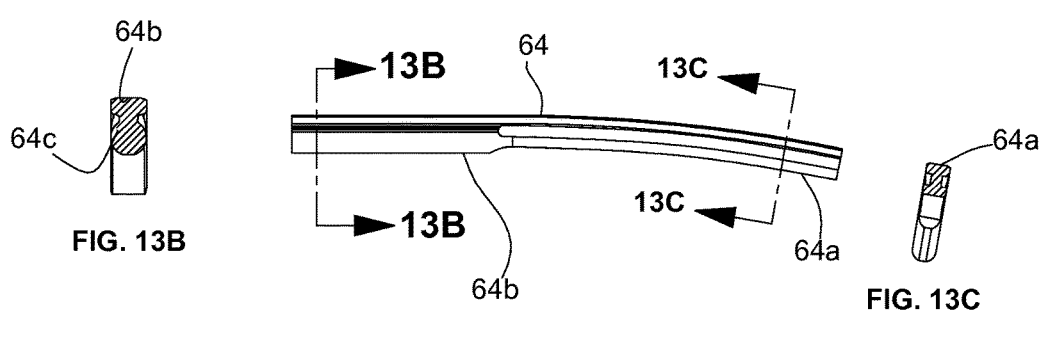
FIG. 13B
FIG. 13A
FIG. 13C

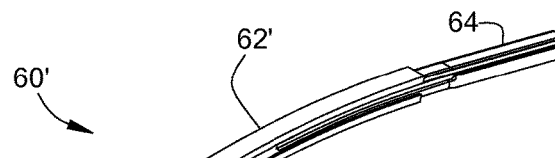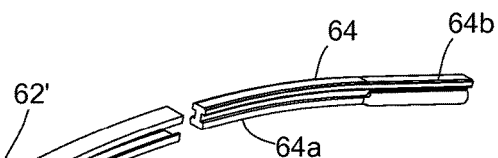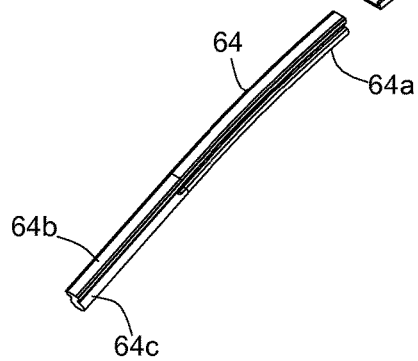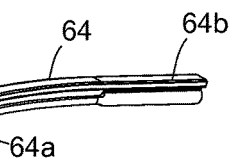
FIG. 14A
FIG. 14B
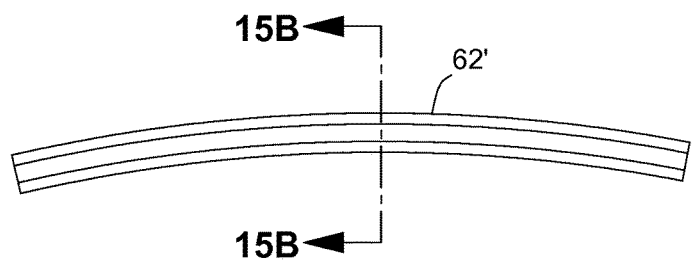
FIG. 15A
FIG. 15B

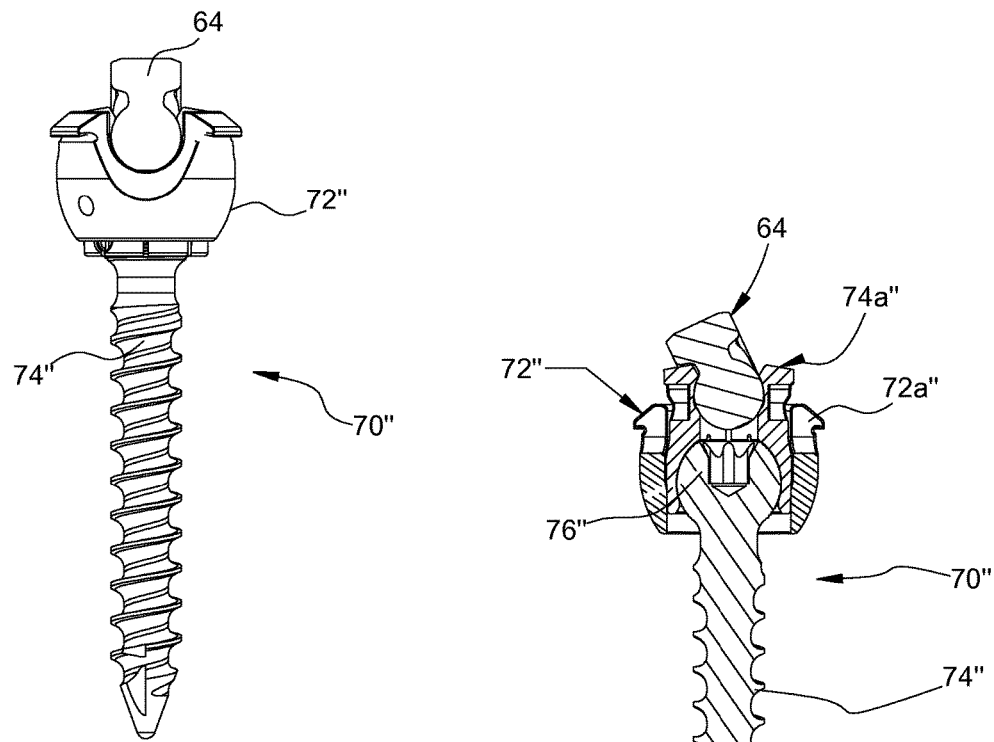
FIG. 17A
FIG. 17C
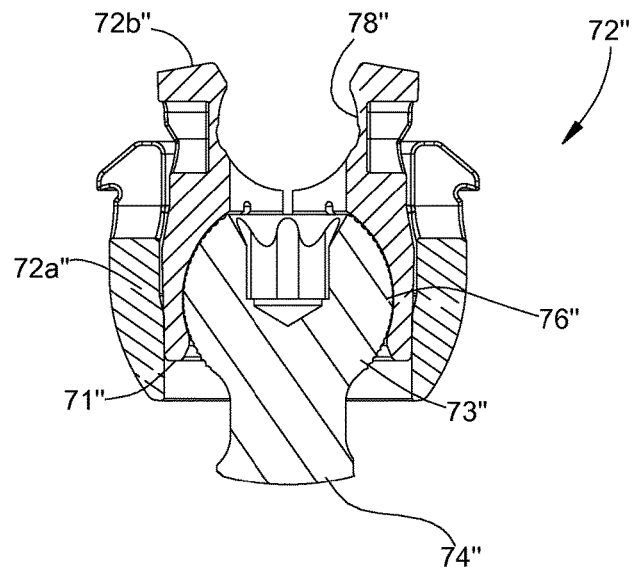
**FIG. 17B

GROWING SPINE MODEL

CROSS-REFERENCE TO RELATED APPLICATIONS

This application claims the benefit of, and priority to, U.S. Provisional Patent Application Ser. No. 62/024,127, which was filed on Jul. 14, 2014, the entire contents of which are hereby incorporated herein by reference.

TECHNICAL FIELD

The present disclosure relates to orthopedic surgical devices for stabilizing and fixing the bones and joints of a body. Particularly, the present disclosure relates to a growing spine model that simulates the effects of expanding vertebral bodies apart and the three dimensional impact on a spinal column.

BACKGROUND

The spinal column is a complex system of bones and connective tissues that provide support for the human body and protection for the spinal cord and nerves. The human spine is comprised of thirty-three vertebrae at birth and twenty-four as a mature adult. Between each pair of vertebrae is an intervertebral disc, which maintains the space between adjacent vertebrae and acts as a cushion under compressive, bending, and rotational loads and motions.

There are various disorders, diseases, and types of injury that the spinal column may experience in a lifetime. The problems may include, but are not limited to, scoliosis, kyphosis, excessive lordosis, spondylolisthesis, slipped or ruptured disc, degenerative disc disease, vertebral body fracture, and tumors. Persons suffering from any of the above conditions typically experience extreme and/or debilitating pain, and often times diminished nerve function.

Conventionally, orthopedic surgeons receive training in the use of orthopedic devices and the performance of surgical methods to correct vertebral column injuries and diseases by the application of methods and devices on cadavers. The amount of training for each surgeon is limited by the expense, availability, scheduling, and other logistic requirements associated with the use of cadavers.

Further, spine surgeons, when planning for a surgical procedure on a specific patient, are normally limited to a study of two-dimensional radiographic data and a complete lack of hands-on manipulation rehearsal of a method prior to operating on a patient. In recent years there has been a growing number of orthopedic practices and hospitals that have made the transition from film to all digital environments. Software based tools for orthopedic image review, analysis, and preoperative planning are becoming conventional tools of the orthopedic surgeon. While advances in surgical planning have been made, they are simply limited to improvements in providing two-dimensional data for study and planning. To receive hands-on training or to rehearse a surgical method, a surgeon is still limited to the use of cadavers.

With such training and rehearsal limitations, it is not uncommon during an actual surgical procedure for a surgeon to encounter unforeseen anatomical or biomechanical conditions that may require an immediate revision of the surgical plan as it proceeds. The need to provide more, less expensive ways to train surgeons or to permit hands-on surgery planning and rehearsal in the use of spinal surgery methods and devices is particularly needed in the treatment of spine conditions, such as scoliosis. It is not uncommon in the surgical treatment of scoliosis that forceful manipulation and realignment of the spinal column can be a long, complicated mechanical effort that often includes a serious threat of damage to the spinal cord.

Further, the biomechanical behavior and particularly soft tissue forces on the spinal column when applying methods and devices to a cadaver are far different from that which are normally experienced in a surgical procedure on a living patient.

Thus, a need exists for a three-dimensional hands-on spinal surgery modeling system that can be used by surgeons for training in the use of devices and methods, and that can also be used in the planning and manual rehearsal of surgical procedures for patients.

SUMMARY

The present disclosure is directed to a three-dimensional modeling system for hands-on training and/or surgical rehearsal of surgical methods, devices, and instruments that provides a clinician with an anatomically and biomechanically realistic model of a spine in a non-surgical environment. The system includes a spine movement device that interacts with a spine model so as to configure the spine in a desired alignment, with selected degrees of force vectors biasing the spine in selected positions to provide a modeling system that can be used as a surgeon training device or as a spinal surgery rehearsal platform.

The spine movement device of the system of the present disclosure may be used with any of a variety of spine models that can be selected by size and conformation to simulate, for example, pediatric, adult, and geriatric spinal columns.

The system can be prepared to simulate the anatomy and biomechanics of a patient such that a three-dimensional hands-on surgery rehearsal platform is provided.

The system of the present disclosure is useful for simulating common deformities such as scoliosis, kyphosis, sagittal imbalance, and other spinal abnormalities. In addition to the training benefits provided by the system, manual rehearsal of planned methods in the treatment of spinal deformities and conditions may provide a faster, more effective, and safer surgical correction for a patient.

The system of the present disclosure can simulate a spine as it is growing, simulating the growth of vertebral bodies and discs.

In accordance with an aspect of the present disclosure, a spinal surgery modeling system includes a spine model including vertebral bodies defining disc spaces between adjacent vertebral bodies, and a spine movement device. The spine movement device includes a plurality of cylinders, a plurality of pistons, and a plurality of inflation members. Each cylinder of the plurality of cylinders includes an elongate body defining a bore, and an inlet and an outlet. Each piston of the plurality of pistons includes an elongate body having a proximal end and a distal end, and the distal end of each piston extends into the inlet and frictionally engages the bore of one cylinder of the plurality of cylinders. Each inflation member of the plurality of inflation members is disposed within one of the disc spaces of the spine model and is fluidly coupled to the outlet of one cylinder of the plurality of cylinders. The plurality of pistons are movable with respect to the plurality of cylinders to hydraulically inflate or deflate the plurality of inflation members.

The spine movement device may further includes a plurality of tubes. Each tube of the plurality of tubes may fluidly connect the outlet of one cylinder of the plurality of cylinders with one inflation member of the plurality of inflation members.

The spine movement device may further include a back plate having plurality of openings extending therethrough, wherein each cylinder of the plurality of cylinders is positioned through one opening of the plurality of openings. In embodiments, the spine movement device further includes a front plate positioned in spaced relation relative to the back plate, and the proximal ends of the plurality of pistons are secured to the front plate. In some embodiments, the front plate includes a plurality of recesses aligned with the plurality of openings of the back plate and mechanically engaged with the proximal ends of the plurality of pistons to lock the plurality of pistons to the front plate.

The spine movement device may further include a linear actuating member having an elongated body extending through the front and back plates for moving the plurality of pistons proximally and distally with respect to the plurality of cylinders. In embodiments, the elongated body of the linear actuating member extends through central apertures defined in each of the front and back plates, and each opening of the plurality of openings of the front and back plates are disposed around the respective central aperture. In some embodiments, the central aperture of the back plate is a threaded aperture that engages a threaded portion of the linear actuating member. In certain embodiments, the spine movement device further includes a rotatable handle secured to a proximal end of the linear actuating member.

In embodiments, the spine movement device further includes an intermediate plate having plurality of opening extending therethrough that are aligned with the plurality of openings of the back plate, wherein the proximal end of each cylinder of the plurality of cylinders includes a catch positioned between the intermediate plate and the back plate.

The spinal surgery modeling system may further include at least one spinal construct attached to the spine model. In embodiments, the at least one spinal construct includes a plurality of screws and an adjustable rod. The adjustable rod may include a center member and first and second end members. Each of the first and second end members may include a first segment slidably engagable with an interior surface of the center member, and a second segment including a connecting portion securable to at least one of the plurality of screws. In some embodiments, the first segment of each of the first and second end members has an I-beam shape and the second segment of each of the first and second end members has a compound shape including an elongate round portion, an elongate head portion, and a neck portion connecting the elongate round portion with the elongate head portion.

In accordance with another aspect of the present disclosure, a method of simulating a spine includes: positioning an inflation member within a disc space between vertebral bodies of a spine model, the inflation member fluidly coupled to a cylinder of a spine movement device, the spine movement device including a piston having a distal end frictionally engaged with a bore of the cylinder; and moving the piston distally within the bore of the cylinder to displace a fluid disposed within the cylinder into the inflation member to expand the inflation member and increase a distance between the vertebral bodies.

In embodiments, moving the piston distally includes rotating a handle secured to a linear actuating member of the spine movement device to impart linear motion to the piston.

The method may further include moving the piston proximally within the bore of the cylinder to draw the fluid into the bore of the cylinder to deflate the inflation member and decrease the distance between the vertebral bodies.

The method may further include implanting a spinal construct in the spine model. In embodiments, implanting the spinal construct includes securing an adjustable rod to the spine model with screws such that moving the piston distally exerts a force on the screws moving the screws away from each other and moving end members of the adjustable rod relative to a center member of the adjustable rod.

In accordance with yet another aspect of the present disclosure, a method of using an adjustable rod includes: implanting a first screw and a second screw in spaced relation relative to each other in vertebral bodies of a spine; and securing a first end member of an adjustable rod to the first screw and a second end member of the adjustable rod in the second screw, the first and second end members being in slidable engagement with a center member extending between the first and second screws.

Other aspects, features, and advantages will be apparent from the description, drawings, and the claims.

BRIEF DESCRIPTION OF THE DRAWINGS

FIG. 7A is a side view of the spinal surgery modeling system of FIG. 1 in a first position;

FIG. 7B is an enlarged view of a portion of a spine model of the spinal surgery modeling system, shown in the area of detail 7B identified in FIG. 7A;

FIG. 9A is a side view of the spinal surgery modeling system of FIG. 1 in a second position;

FIG. 9B is an enlarged view of a portion of a spine model of the spinal surgery modeling system, shown in the area of detail 9B identified in FIG. 9A;

FIG. 11A is a front, perspective view of a spinal construct of the spinal surgical modeling system of FIG. 1;

FIG. 11B is an exploded view of the spinal construct of FIG. 11A;

FIG. 12A is a side view of a central member of the spinal construct of FIG. 11A;

FIG. 12B is a cross-sectional view of the central member of FIG. 12A, taken along line 12B-12B of FIG. 12A;

FIG. 13A is a side view of an end member of the spinal construct of FIG. 11A;

FIG. 13B is a cross-sectional view of the end member of FIG. 13A, taken along line 13B-13B of FIG. 13A;

FIG. 13C is a cross-sectional view of the end member of FIG. 13A, taken along line 13C-13C of FIG. 13A;

FIG. 14A is a front, perspective view of a spinal construct for use with the spinal surgery modeling system of FIG. 1 in accordance with another embodiment of the present disclosure;

FIG. 14B is an exploded view of the spinal construct of FIG. 14A;

FIG. 15A is a side view of a central member of the spinal construct of FIG. 14A;

FIG. 15B is a cross-sectional view of the central member of FIG. 15A, taken along line 15B-15B of FIG. 15A;

FIG. 17A is an end view of a spinal construct including a taper lock screw and an adjustable rod in accordance with another embodiment of the present disclosure;

FIG. 17B is a partial cross-sectional view of a portion of the taper lock screw of FIG. 17A shown in a partially locked position; and FIG. 17C is an end, cross-sectional view of the taper lock screw of FIG. 17A in an unlocked position with the adjustable rod.

Corresponding reference characters indicate corresponding parts throughout the drawings.

DETAILED DESCRIPTION

Figures 1, 2:
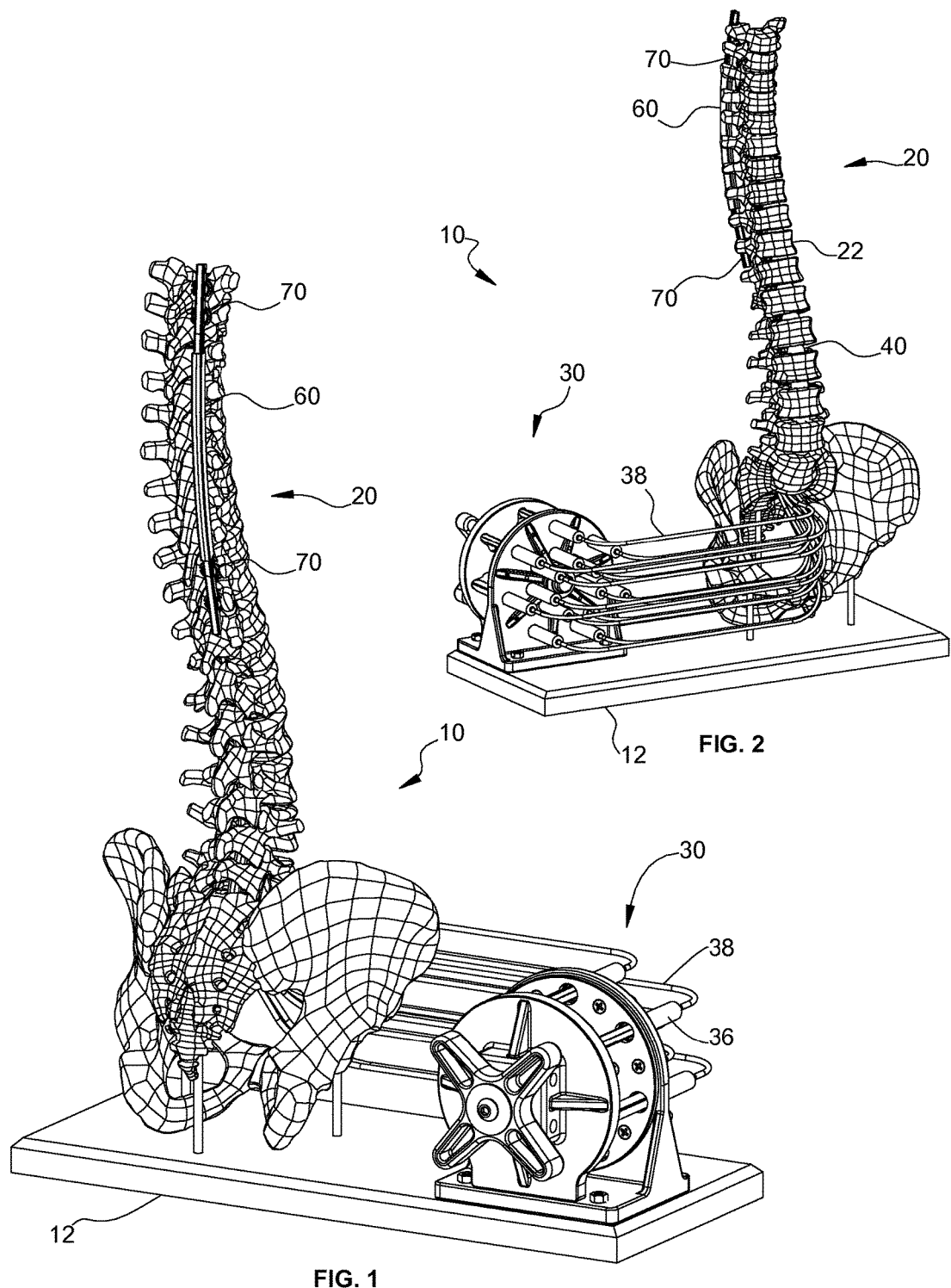
FIG. 1 is a front, perspective view of a spinal surgery modeling system in accordance with an embodiment of the present disclosure.
FIG. 2 is a back, perspective view of the spinal surgery modeling system of FIG. 1.
Figure 5:
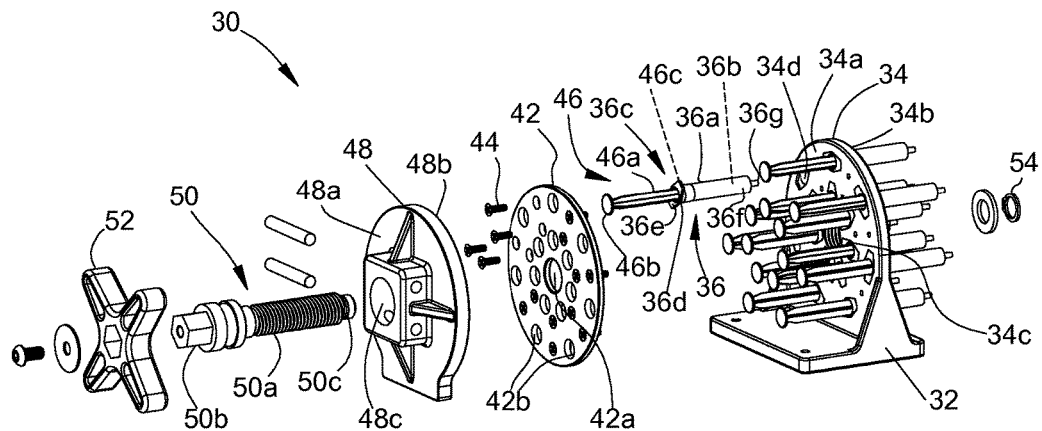
FIG. 5 is an exploded view of the spine movement device of FIG. 3.
Figure 3:
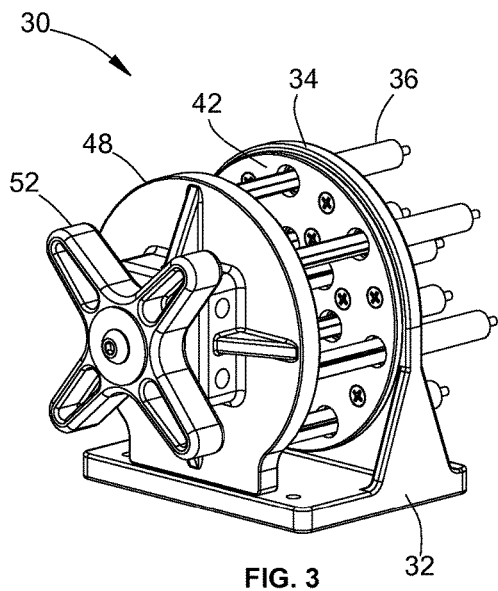
FIG. 3 is a front, perspective view of a spine movement device of the spinal surgery modeling system of FIG. 1.
Figure 4:
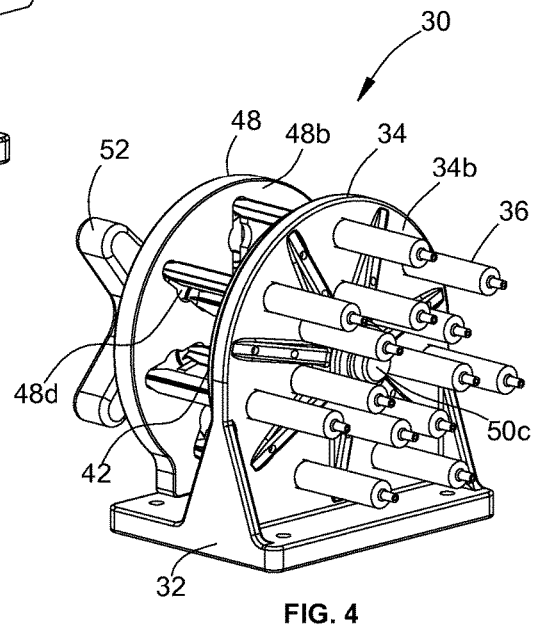
FIG. 4 is a back, perspective view of the spine movement device of FIG. 3.
Figure 6B:
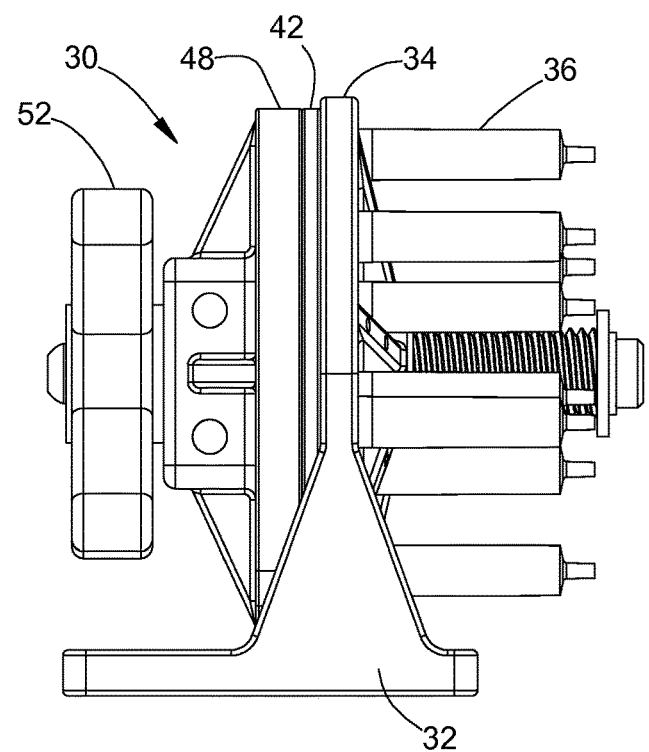
FIG. 6B is a side view of the spine movement device of FIG. 3 in a second position.
Figure 6A:
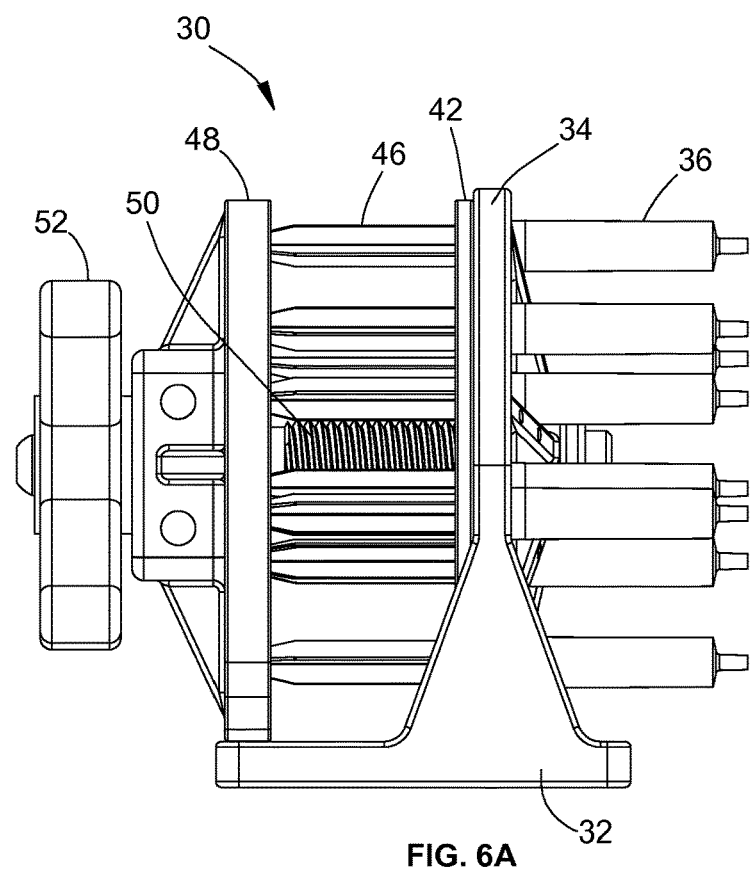
FIG. 6A is a side view of the spine movement device of FIG. 3 in a first position.
Figure 8B:
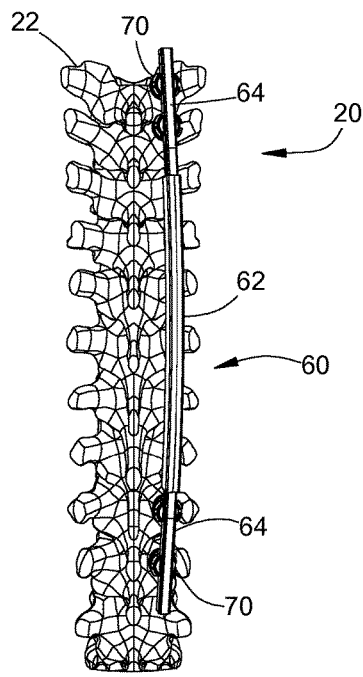
FIG. 8B is an enlarged view of a portion of a spine model of the spinal surgery modeling system, shown in the area of detail 8B identified in FIG. 8A.
Figure 10B:
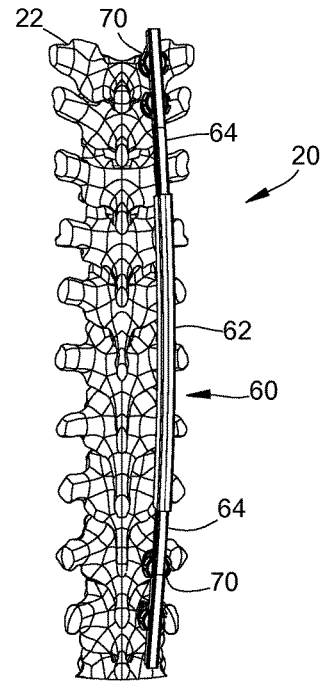
FIG. 10B is an enlarged view of a portion of a spine model of the spinal surgery modeling system, shown in the area of detail 10B identified in FIG. 10A.
Figure 8A:
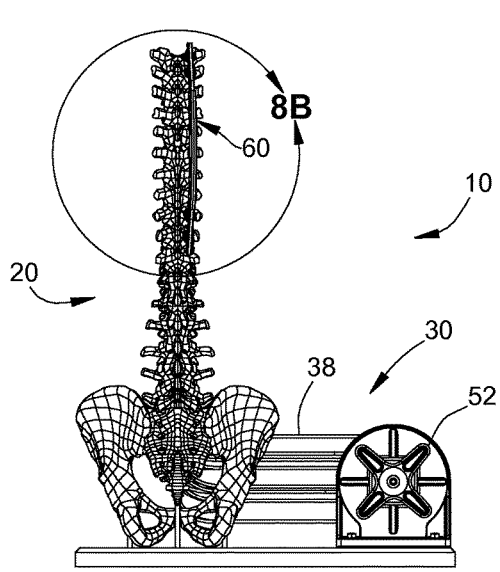
FIG. 8A is a front view of the spinal surgery modeling system of FIG. 7A.
Figure 10A:
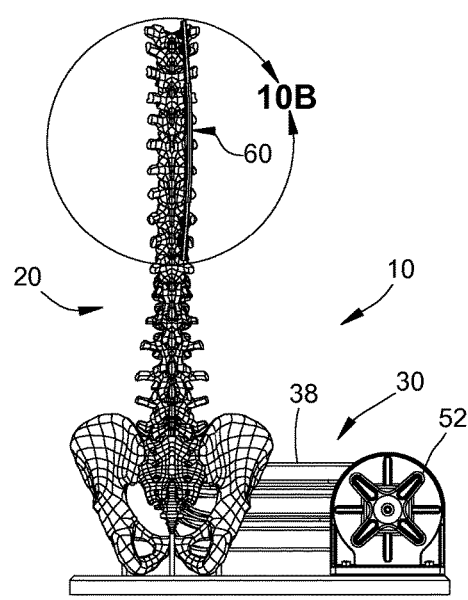
FIG. 10A is a front view of the spinal surgery modeling system of FIG. 9A.

Detailed embodiments of the present disclosure are disclosed herein; however, it is understood that the following description and each of the accompanying figures are provided as exemplary embodiments of the present disclosure. Thus, the specific structural and functional details provided in the following description are non-limiting, and various modifications may be made without departing from the spirit and scope of the present disclosure.

In this disclosure, the term "clinician" refers to a doctor, nurse, or other care provider and may include support personnel. As used herein, the term "proximal" refers to the portion of a structure closer to a clinician, while the term "distal" refers to the portion of the same structure further from the clinician. The term "cephalad" indicates a direction toward a patient's head, whereas the term "caudad" indicates a direction toward a patient's feet. The term "lateral" indicates a direction toward a side of the body of a patient, i.e., away from the middle of the body of the patient, whereas the term "medial" refers to a position toward the middle of the body of a patient. The term "posterior" indicates a direction toward a patient's back, and the term "anterior" indicates a direction toward a patient's front. Additionally, in the drawings and in the description that follows, terms such as front, rear, upper, lower, top, bottom, and similar directional terms are used simply for convenience of description and are not intended to limit the disclosure.

As shown in FIGS. 1 and 2, a spinal surgery modeling system 10 includes a spine model 20, a spine movement device 30, and optionally, one or more spinal constructs, such an adjustable rod 60 and screws 70. The spine model 20 and the spine movement device 30 may each be removably or fixedly attached to a base 12, and the adjustable rod 60 and screw 70 may be affixed to the spine model 20. The spine model 20 may be a cadaveric or synthetic anatomically and mechanically correct spine model of a pediatric, adult, or geriatric spine which may exhibit any of a variety of spine pathologies.

Turning now to FIGS. 3-6B, in conjunction with FIGS. 1 and 2, the spine movement device 30 includes a main frame 32 including a back plate 34 having a proximal surface 34a, a distal surface 34b, a threaded central aperture 34c, and a plurality of openings 34d disposed around the central aperture 34c. Cylinders 36 are positioned through the openings 34d of the back plate 34. Each cylinder 36 includes an elongated body 36a defining a bore 36b which may have a substantially consistent diameters along the length thereof, a proximal end 36c including an inlet 36d and a catch 36e that engages the proximal surface 34a of the back plate 34, and a distal end 36f including an outlet 36g. The outlets 36g of each cylinder 36 is fluidly connected to a tube or tubing 38 that is fluidly connected to an inflation member 40, such as a balloon.

An intermediate plate 42 includes a central aperture 42a and a plurality of openings 42b disposed around the central aperture 42a that are sized and positioned to correspond with the openings 34d of the back plate 34. The intermediate plate 42 is placed adjacent to the proximal surface 34a of the back plate 34, with openings 42b aligned with openings 34d and the catch 36e of each cylinder 36 positioned between the intermediate plate 42 and the back plate 34. The intermediate plate 42 is secured to the back plate 34 with fixation members 44, such as screws.

Pistons 46 include an elongated body 46a that may be the length of the elongated body 36a of the cylinders 36, a proximal end 46b that is secured to a front plate 48, and a distal end 46c that is dimensioned to frictionally engage the bore 36b of the cylinders 36. The front plate 48 includes a proximal surface 48a, a distal surface 48b, and a central aperture 48c extending through the proximal and distal surfaces 48a, 48b. The distal surface 48b includes a plurality of recesses 48d that are aligned with the openings 34d of the back plate 34 and mechanically engage and lock the proximal end 46b of the pistons 46 thereto. The front plate 48 is positioned in spaced relation with respect to the back plate 34 with the distal ends 46c of the pistons 36 disposed within the bore 36b of the cylinders 36.

A linear actuating member 50, such as a threaded screw, includes an elongated body 50a having a proximal end 50b and a distal end 50c. The elongated body 50a of the linear actuating member 50 is positioned through the central apertures 34c, 42a, and 48c of the back, intermediate, and front plates 34, 42, and 48, respectively. A handle 52 is secured to the proximal end 50b of the linear actuating member 50 and a nut 54 is disposed on the distal end 50c of the linear actuating member 50 adjacent the distal surface 34b of the back plate 34 to secure the components of the device 30 together.

Rotation of the handle 52 rotates the linear actuating member 50, which in turn imparts linear motion to the linear actuating member 50 as linear actuating member 50 engages the threaded central aperture 34c of the back plate 34. The linear motion thereby causes the front plate 48 to move proximally or distally with respect to the back plate 34, and in turn, causes the pistons 46 to move proximally or distally within the bores 36b of the cylinders 36. A fluid (not shown), such as a liquid or gas, is disposed within the bores 36b of the cylinders 36 such that distal movement of the pistons 46 displaces the fluid and hydraulically inflates/expands the inflation members 40, and proximal movement of the pistons 46 draws the fluid back into the bores 36*b* of the cylinders 36, hydraulically deflating the inflation members 40. The amount of fluid contained within each of the cylinders 36 may be the same or different.

In an exemplary method of use, each inflation member 40 is positioned within the disc space between each of the vertebral bodies 22 of the spine model 20, as shown in FIGS. 7A-8B. A user rotates the handle 52 of the spine movement device 30 to drive the linear actuating member 50 distally thereby displacing fluid from the cylinders 36 into the inflation members 40. As shown in FIGS. 9A-10B, expansion of the inflation members 40 increases the distance between the vertebral bodies 22 simulating, for example, growth of a spine.

The vertebral bodies 22 of the spine model 20 are freely accessible to a user of the system 10. Accordingly, various spinal constructs, such as a rod 60 and screws 70, may be placed on the vertebral bodies 22 to allow the user to practice methods of placing such spinal constructs on a spine and/or to observe the interaction of the spinal constructs with a spine.

As shown in FIGS. 11A-13C, in conjunction with FIGS. 7A-10B, an adjustable rod 60 may include a center member 62 and end members 64. Each end member 64 includes a first segment 64*a* which slidably engages an interior surface 62*a* of the center member 62 that includes a complementary geometry to that of the first segment 64*a*. While the interior surface 62*a* of the center member 62 is shown as a continuous, closed square-shaped surface, it should be understood that the interior surface 62*a* may have any shape suitable for slidably engaging end members 64, such as tubular, ovular, elliptical, or rectangular, for example, among other shapes that are complementary to the shape of the first segment 64*a* of the end members 64. As another example, the interior surface 62*a*' of a center member 62' of an adjustable rod 60' may be a semi-continuous surface, having, for example, a c-shaped profile, as shown in FIGS. 14A-15B. Each end member 64 also includes a second segment 64*b* that includes a connecting portion 64*c* that may be secured to a screw 70.

It is contemplated that adjustable rod 60, center member 62, and end members 64 may be used outside of the disclosed spine model 20 and used, in situ, as a standalone spinal implant. In use as a spinal implant, adjustable rod 60 may be configured as follows. Center member 62 may include one or more stops that function to control the expansion and/or contraction of the adjustable rod 60. In particular, one end member 64 may be fixed relative to center member 60, while the other end member 64 is slidable between a minimum amount of extension and a maximum amount of extension with respect to center member 62. Alternatively, both end members 64 may be slidable with respect to center member 62 between a minimum amount of extension and a maximum amount of extension. Further, one end member 64 may have a different range of travel as compared to the other end member 64. Further still, one or both end members 64 may be free to expand and inhibited from contracting relative to center member 62.

Each end member 64 is shown having a combination configuration with a portion having an I-beam shape (e.g., first segment 64*a*) and a portion with a compound shape (e.g., second segment 64*b*). The compound shape includes an elongate round portion, an elongate head portion, and a neck portion connecting the elongate round portion with the elongate head portion. It is contemplated that the entire length of one or both end members 64 has the compound shape and that center member 62 may be configured to receive the compound shape instead of the I-beam shape as shown in FIGS. 11A and 11B. It is also contemplated that center member 62 may receive one end member 64 with an I-beam shape and another end member 64 having a compound shape. It is also within the scope of the present disclosure that adjustable rod 60 may be used with the components and/or instruments (e.g., rod reducers, rod benders, bone screws, etc.) disclosed in U.S. patent application Ser. No. 13/636,416, filed on Nov. 8, 2012 and which published as U.S. Patent Application Publication No. 2013/0144342, and in U.S. Pat. No. 8,882,817, both of which are herein incorporated by reference in their entireties.

Figure 16A:
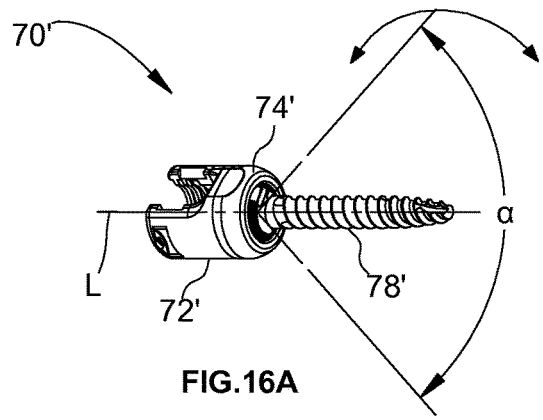
FIG. 16A is a perspective view of a polyaxial pedicle screw.
Figure 16B:
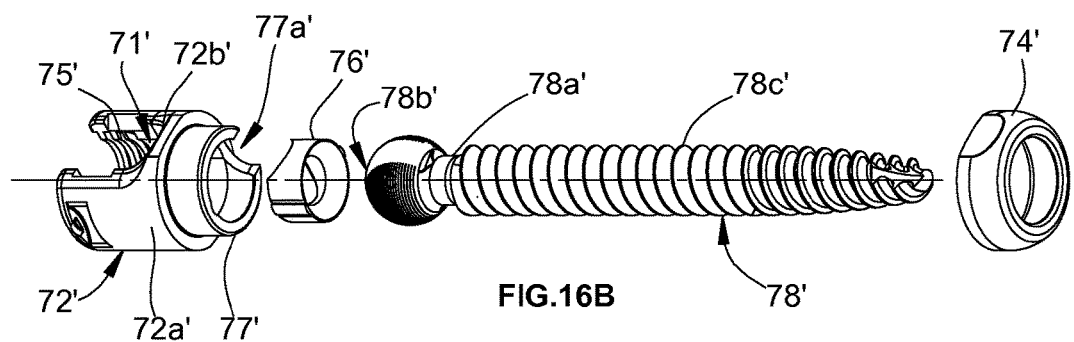
FIG. 16B is an exploded, perspective view of the polyaxial pedicle screw of FIG. 16A.
Figure 16C:
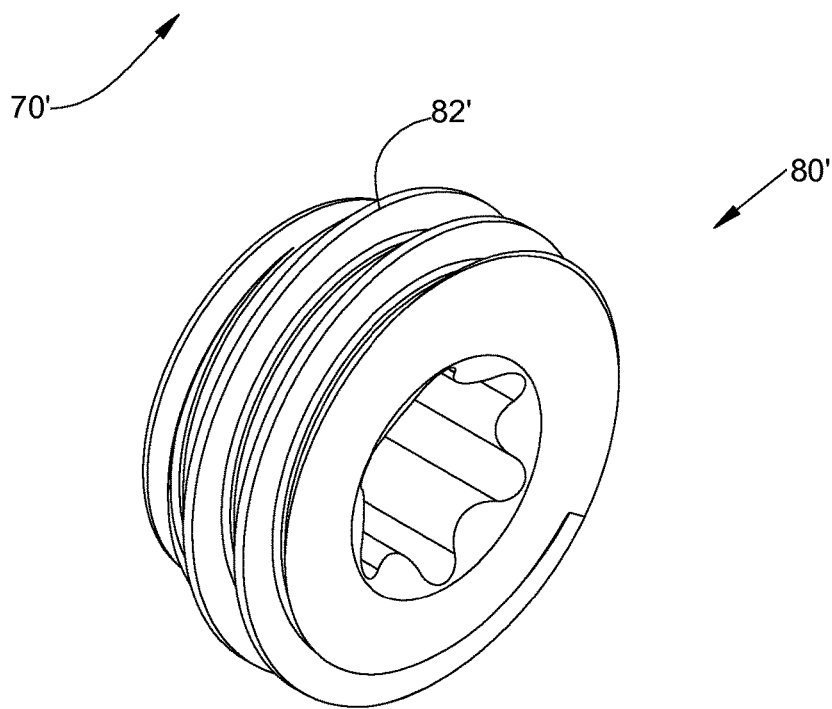
FIG. 16C is a perspective view of a set screw usable with the polyaxial pedicle screw of FIGS. 16A and 16B.

An embodiment of a screw usable with the end members 64 is shown in FIGS. 16A-16C, generally, as a polyaxial pedicle screw 70' including a housing 72', a compression ring or cap 74', an anvil 76', a bone screw member 78', and a set screw 80'. The housing 72' includes opposing walls 72*a*' and 72*b*' that define a U-shaped channel 71' therebetween. The internal surfaces of opposing walls 72*a*' and 72*b*' include threaded portions 75' that are threadably engagable with external threads 82' of the set screw 80' (FIG. 16C) to facilitate the securement of an end member 64 of an adjustable rod 60 and 60' (see e.g., FIGS. 11A and 14A) within the channel 71' of the housing 72' adjacent the anvil 76'. The housing 72' includes a collar 77' extending therefrom that is adapted to facilitate the securement of the compression ring or cap 74' to the housing 72' once the bone screw member 78' is secured to the housing 72'. The collar 77' has a cut out 77*a*' that provides a recess for the reception of a portion of the bone screw member 78', namely a neck 78*a*', and facilitates the positioning of the bone screw member 78' within the housing 72' from a distal end of the housing 72'.

The bone screw member 78' includes a head 78*b*' and a threaded shaft 78*c*' extending from the head 78*b*'. The bone screw member 78' may be a self-starting fastener or self-tapping fastener. The compression ring or cap 74' may be slid over the threaded shaft 78*c*' of the bone screw member 78' and affixed to the collar 77' of the housing 72' to further secure the bone screw member 78' to the housing 72'. Once inserted, the bone screw member 78' is selectively positionable at plurality of angles relative to the housing 72' and may be fixedly securable relative to the housing 72' at a cone angle $\alpha$ in the range of 60 to 80 degrees, preferably 70 degrees, from the longitudinal axis "L" extending through the polyaxial pedicle screw 70'. The anvil 76' is positionable within the housing 72' adjacent the head 78*b*' of the bone screw member 78' to facilitate the securement of the end member 64 within the housing 72'. The set screw 80' is positionable within the housing 72', e.g., via threading engagement, to secure the end member 64 within the housing 72' adjacent the anvil 76'.

As assembled, the pedicle screw 70' is fastenable to a bone structure (e.g. vertebra) and the housing 72' is repositionable in a plurality of directions with respect to the bone screw member 78' as discussed above. To this end, the housing 72' is rotatable about the longitudinal axis "L" extending through the polyaxial pedicle screw 70' as well as pivotable relative to the longitudinal axis "L" and the bone screw member 78'. A connecting portion 64*c* of an end member 64 (see e.g., FIG. 13B) is positionable in the U-shaped channel 71' of the housing 72' and is nested against the anvil 76'. The end member 64 is then secured to the pedicle screw 70' using the set screw 80'.

Another embodiment of a screw usable with the end members 64 is shown in FIGS. 17A-17C, generally, as a multi-planar taper lock screw 70" including a dual layered housing 72" and a screw shaft 74" having a spherically configured screw head 76" rotatably coupled with housing 72". The taper lock screw 70" enables manipulation of the screw shaft 74" about multiple axes, whereby the taper lock screw 70" is capable of releasably securing an end member 64 of an adjustable rod with taper lock screws 70" on multiple vertebral bodies that are aligned in the spinal column on different planes due to the natural curvature of the spine.

Dual layered housing 72" includes an outer housing 72a" and an inner housing 72b". Outer housing 72a" can be selectively positioned relative to inner housing 72b" to fully lock screw head 76" and end member 64 in position within inner housing 72b" (FIG. 17A), or alternatively to selectively partially lock screw head 76" and/or end member 64 in position while permitting a sliding and/or rotating motion of the end member 64 relative to screw head 76", and the screw head 76" relative to the housing 72", respectively (FIG. 17B). Specifically, outer housing 72a" is configured such that at least a portion of an inner surface of outer housing 72a" is capable of sliding over a portion of an outer surface of inner housing 72b" in upward and downward directions along the longitudinal axis of taper lock screw 70". When outer housing 72a" is slid upward in relation to inner housing 72b" an inner surface of outer housing 72a" causes inner housing 72b" to impart compressive force radially inward to secure end member 64 at least partially disposed therein.

Inner housing 72b" defines a connecting rod slot 78" that is configured and dimensioned to accommodate and retain the end member geometry of end member 64 in the inner housing 72b" without impairing the locking ability of the taper lock screw 70" Inner walls that define connecting rod slot 78" imparts compressive force to end member 64 disposed in connecting rod slot 78", whereby the inner walls serve to securely lock and hold end member 64 in its relative position to inner housing 72b". This required forced is provided by the operational engagement of a locking device (not shown) with the taper lock screw 70" that results in an upward sliding motion of the outer housing 72a" relative to the inner housing 72b" Inner housing 72b" further defines a screw head articulation recess 71" in a lower portion of inner housing 72b" that has a complementary surface configuration to the generally spherical shape of screw head 76" to facilitate multi-planar rotational articulation of screw head 76" within articulation recess 71". The lower-most portion of inner housing 72b" defines a screw shaft exit portal 73" that is sized small enough to retain the spherical screw head 76" within screw head articulation recess 71", but that is large enough to allow multi-directional movement of screw shaft 74" that extends exterior to inner housing 72b".

One suitable taper lock screw is commercially available from K2M, Inc. (Leesburg, Va.) under the trade name MESA™. In addition, suitable multi-planar taper lock screws are shown and described in U.S. Patent Application Publication No. 2008/0027432 and in U.S. Patent Application Publication No. 2007/0093817, both of which are herein incorporated by reference in their entireties. It is contemplated that other types of screws such as, e.g., a fixed screw in which the head of the screw has no movement relative to the screw shaft, a mono-axial screw such as that disclosed in U.S. Patent Application Publication No. 2009/0105716, and a uni-axial screw such as that disclosed in U.S. Patent Application Publication No. 2009/0105769 may be utilized. Suitable mono-axial and uni-axial screws are also commercially available under the trade name MESA™.

With reference again to FIGS. 7A-10B, in conjunction with FIGS. 11A-13C, in use, the screws 70 are implanted, in spaced relation from each other, into vertebral bodies 22 of the spine model 20. As the spine movement device 30 is actuated and the distance between the vertebral bodies 22 increases (for example, during movement from the first position of FIGS. 7A-8B to the second position of FIGS. 9A-10B), a force is exerted on the screws 70 moving them away from each other, which in turn moves the end members 64 relative to the center member 62.

A number of embodiments have been described. Nevertheless, it will be understood that various modifications may be made without departing from the spirit and scope of the disclosure.

What is claimed is:

1. A spinal surgery modeling system comprising: a spinal construct including: a plurality of screws; and an adjustable rod including a center member and first and second end members, the center member having a monolithic construction and a fixed axial length, each of the first and second end members including a first segment in direct slidable engagement with an interior surface of the center member such that at least one of the first and second end members is rotationally fixed relative to the center member and both of the first and second end members are axially movable and freely expandable relative to the center member, and a second segment including a connecting portion securable to at least one screw of the plurality of screws; a spine model including vertebral bodies defining disc spaces between adjacent vertebral bodies, the spinal construct placed on, and securable to, the vertebral bodies of the spine model by the plurality of screws; and a spine movement device configured to simulate spine growth by increasing a distance between each of the vertebral bodies of the spine model, the spine movement device including: a plurality of cylinders, each cylinder of the plurality of cylinders including an elongate body defining a bore, the elongate body including an inlet and an outlet; a plurality of pistons, each piston of the plurality of pistons including an elongate body having a proximal end and a distal end, the distal end of each piston extending into the inlet and frictionally engaging the bore of one cylinder of the plurality of cylinders; and a plurality of inflation members, each inflation member of the plurality of inflation members disposed within one of the disc spaces of the spine model and fluidly coupled to the outlet of one cylinder of the plurality of cylinders; wherein the plurality of pistons are simultaneously movable with respect to the plurality of cylinders to hydraulically inflate or deflate the plurality of inflation members to increase or decrease the distance between each of the vertebral bodies of the spine model such that during inflation or deflation of the plurality of inflation members, the first and second end members of the adjustable rod move relative to the center member.

2. The spinal surgery modeling system of claim 1, wherein the spine movement device further includes a plurality of tubes, each tube of the plurality of tubes fluidly connecting the outlet of one cylinder of the plurality of cylinders with one inflation member of the plurality of inflation members.

3. The spinal surgery modeling system of claim 1, wherein the spine movement device further includes a back plate having plurality of openings extending therethrough, wherein each cylinder of the plurality of cylinders is positioned through one opening of the plurality of openings.

4. The spinal surgery modeling system of claim 3, wherein the spine movement device further includes a front plate positioned in spaced relation relative to the back plate, and the proximal ends of the plurality of pistons are secured to the front plate.

5. The spinal surgery modeling system of claim 4, wherein the front plate includes a plurality of recesses aligned with the plurality of openings of the back plate and mechanically engaged with the proximal ends of the plurality of pistons to lock the plurality of pistons to the front plate.

6. The spinal surgery modeling system of claim 4, wherein the spine movement device further includes a linear actuating member having an elongated body extending through the front and back plates for moving the plurality of pistons proximally and distally with respect to the plurality of cylinders.

7. The spinal surgery modeling system of claim 6, wherein the elongated body of the linear actuating member extends through central apertures defined in each of the front and back plates, and each opening of the plurality of openings of the front and back plates are disposed around the respective central aperture.

8. The spinal surgery modeling system of claim 7, wherein the central aperture of the back plate is a threaded aperture that engages a threaded portion of the linear actuating member.

9. The spinal surgery modeling system of claim 6, wherein the spine movement device further includes a rotatable handle secured to a proximal end of the linear actuating member.

10. The spinal surgery modeling system of claim 3, wherein the spine movement device further includes an intermediate plate having plurality of opening extending therethrough that are aligned with the plurality of openings of the back plate, wherein the proximal end of each cylinder of the plurality of cylinders includes a catch positioned between the intermediate plate and the back plate.

11. The spinal surgery modeling system of claim 1, wherein the interior surface of the center member of the spinal construct is a continuous surface having a square-shaped profile.

12. The spinal surgery modeling system of claim 1, wherein the interior surface of the center member of the spinal construct is a semi-continuous surface having a C-shaped profile.

13. The spinal surgery modeling system of claim 1, wherein the second segment of each of the first and second end members of the spinal construct has a compound shape including an elongate round portion, an elongate head portion, and a neck portion connecting the elongate round portion with the elongate head portion.

14. The spinal surgery modeling system of claim 13, wherein the first segment of each of the first and second end members of the spinal construct has a shape that is different from the compound shape of the second segments of the first and second end members.

15. The spinal surgery modeling system of claim 14, where the first segment of each of the first and second end members has an I-beam shape.

16. The spinal surgery modeling system of claim 1, wherein the interior surface of the center member has a complementary geometry to that of the first segments of the first and second end members.

17. The spinal surgery modeling system of claim 1, wherein the first end member has a different range of travel relative to the center member as compared to the second end member.

18. The spinal surgical modeling system of claim 1, wherein the center member of the spinal construct includes a bore defined by the interior surface of the center member, the bore having a uniform dimension along the fixed axial length of the center member.

* * * * *